(12) United States Patent
Parks et al.

(10) Patent No.: US 6,850,228 B1
(45) Date of Patent: Feb. 1, 2005

(54) UNIVERSAL FILE FORMAT FOR DIGITAL RICH INK DATA

(75) Inventors: Michael Jay Parks, Kirkland, WA (US); Charlton E. Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/430,150

(22) Filed: Oct. 29, 1999

(51) Int. Cl.$^7$ .................................................. G09G 5/00
(52) U.S. Cl. ........................ 345/173; 345/179; 345/546; 345/600
(58) Field of Search ................................... 345/169, 173, 345/179, 180, 181, 182, 183, 530, 531, 22, 24, 27, 87–88, 591–593, 597, 600, 603, 604, 605, 543–544, 546, 555; 382/174–177, 178, 179, 187–189, 190, 194–195, 162, 165, 166

(56) References Cited

U.S. PATENT DOCUMENTS

| | | | | |
|---|---|---|---|---|
| 5,139,868 A | * | 8/1992 | Mori et al. ................. | 428/327 |
| 5,267,327 A | * | 11/1993 | Hirayama .................... | 382/13 |
| 5,421,001 A | * | 5/1995 | Methe .......................... | 707/1 |
| 5,491,495 A | * | 2/1996 | Ward et al. ................. | 345/173 |
| 5,577,135 A | * | 11/1996 | Grajski et al. ............. | 382/253 |
| 5,647,017 A | * | 7/1997 | Smithies et al. ............ | 382/119 |
| 5,864,345 A | * | 1/1999 | Wickstrom et al. ......... | 345/589 |
| 5,900,861 A | * | 5/1999 | Nickerson et al. .......... | 345/600 |
| 5,959,629 A | * | 9/1999 | Masui ......................... | 345/179 |
| 5,995,084 A | * | 11/1999 | Chan et al. ................. | 345/173 |
| 6,023,711 A | * | 2/2000 | Bennett et al. ............. | 707/205 |
| 6,108,727 A | * | 8/2000 | Boals et al. ................. | 710/68 |
| 6,119,118 A | * | 9/2000 | Kain et al. ................... | 707/10 |
| 6,128,007 A | * | 10/2000 | Seybold et al. ............. | 345/179 |
| 6,211,881 B1 | * | 4/2001 | Gabler et al. ............... | 345/418 |
| 6,304,851 B1 | * | 10/2001 | Kmack et al. ............... | 705/11 |
| 6,335,727 B1 | * | 1/2002 | Morishita et al. ........... | 345/179 |
| 6,549,918 B1 | * | 4/2003 | Probert, Jr. et al. ......... | 707/203 |

* cited by examiner

*Primary Examiner*—Matthew C. Bella
*Assistant Examiner*—Wesner Sajous
(74) *Attorney, Agent, or Firm*—Law Offices of Albert S. Michalik, PLLC

(57) ABSTRACT

A universal file format for providing digital rich ink data documents. Digital rich ink data is hidden among the ink image data otherwise stored in a widely-accepted image file format. For example, depending on the type of file, data can be concealed in the least significant bit or bits of pixel information, or stored in-different color indexes of a palette that result in the same color output. In other file types, digital rich ink data may be appended after the end of file marker, or placed in a comment area. When such a file is accessed, computing devices capable of handling rich ink data recognize and extract the rich ink data from the file, while devices incapable of recognizing the format are still able to display the ordinary ink data. Two file formats for describing the arrangement of rich ink data are also provided.

76 Claims, 11 Drawing Sheets

UNIVERSAL FILE FORMAT FOR DIGITAL RICH INK DATA

FIELD OF THE INVENTION

The present invention generally relates to digital ink technology for representing pen or mouse movements, and more particularly to storing and communicating digital rich ink data.

BACKGROUND OF THE INVENTION

A rich ink control enables a user to input information to a computer without using a keyboard. For example, a user may use a stylus or other pointing device to write and draw on a touch-sensitive screen of a handheld or palm-sized computing device. A tablet may also be used, such as one connected to a personal computer. For a user, taking notes or drawing sketches with a rich ink control is very much like writing or drawing on paper, and thus a rich ink control provide a convenient means for applications to accept input from a user without using a keyboard.

Rich ink technology stores information about stylus or other pointer movements, such as vector information, along with enhanced information such as pen width, color, pressure, timing, strokes, angle of stylus, and so on. As a result, a digital rich ink data document provides a number of advantages over a conventional image data file. The vectors, pressure, timing, angle of the stylus, and other additional information stored in the digital rich ink data document can be analyzed for improved handwriting recognition. A digital rich ink data document also provides possibilities for many improvements in display, including higher resolution, editing, smoothing, and/or alteration of individual elements, for example.

While digital rich ink thus has many benefits over bit-mapped image file formats and the like that may alternatively store handwritten input, a specialized rendering engine is needed to convert digital rich ink data into a readable, viewable form. Many computing devices, such as small hand-held devices, do not include such an engine.

As a result, the use of digital rich ink is limited by the number and types of devices that are able to interpret it. For-example, if a digital rich ink document is communicated via e-mail or another method to another machine, the remote computer may or may not have the specialized engine which can interpret the digital rich ink data and render an image therefrom. Therefore, the sender is essentially left with two choices. First, the digital rich ink data can be transmitted under the assumption that the recipient can read the file, risking the possibility that the recipient does not have a reader that is capable of reading the digital rich ink data. Second, the document can be forwarded under a widely-accepted image format, e.g., bitmap (BMP) files, GIF, TIF files and so on that most machines can interpret, whereby it is highly likely that the recipient will be able to read the document. However, the recipient will not get the benefit of digital rich ink technology, even if the user has the appropriate rendering engine.

SUMMARY OF THE INVENTION

Briefly, the present invention is directed to a method and system wherein digital rich ink data is formatted and hidden among the ink image data otherwise stored in another format, such as a widely accepted image file format. When such a file is accessed, computing devices capable of handling digital rich ink data recognize and extract the digital rich ink data from the file, while devices incapable of recognizing the format display the ordinary image data.

Depending on the type of file into which it is concealed, the digital rich ink data may be concealed in many ways, such as in the least significant bit or bits of pixel information, or encoded by using multiple-color indexes to a color palette for a single color. In other file types, digital rich ink data may be appended after the end of file marker, placed in a comment area, and so on.

The present invention also provides a universal, standardized file format for how this concealed/extracted rich ink data is arranged, including header information followed by the data. The header may include information such as the type of data stored, (e.g., rich ink, meta or Word Object), a company identifier, length of the subsequent data, a checksum for the data; and possibly version and method information. A preferred format provides control data and a directory in a header, whereby multiple types of data may be stored in the same image file, including offset information in the directory identifying the starting offset location of each data type.

Other advantages will become apparent from the following detailed description when taken in conjunction with the drawings, in which:

DETAILED DESCRIPTION

Exemplary Operating Environment

Figure 1:
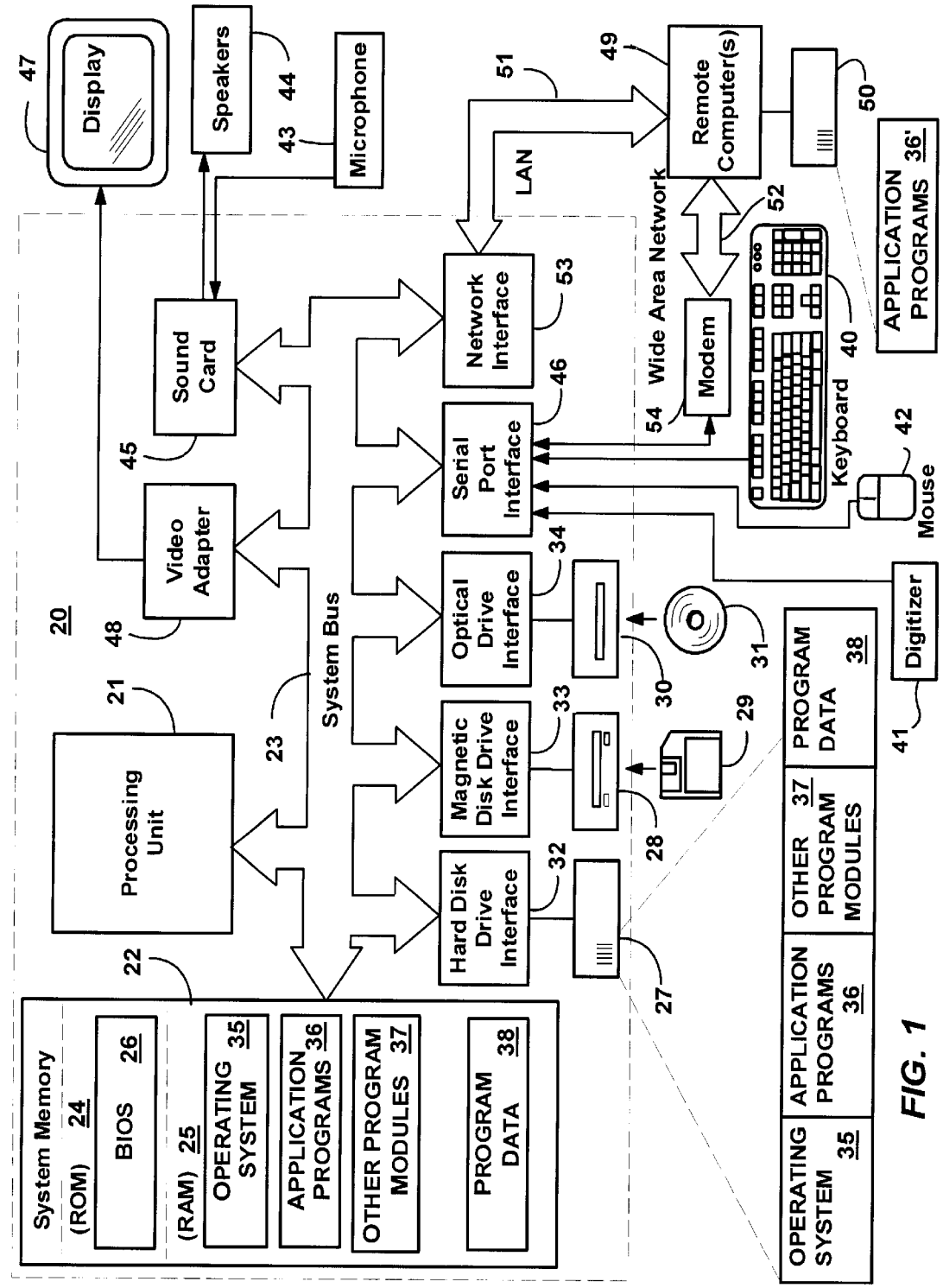
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers: and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device 20 in the form of a conventional personal computer, hand-held computer, palm-sized computer or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital videodisks, Bernoulli cartridges, random access memories: (RAMs), read only memories (ROMs) and the like may also be used in the exemplary operating environment.

A number of program modules, may be stored on the hard disk, magnetic disk 29, optical disk 31, ROM 24 or RAM 25, including an operating system 35. (such as Windows® 2000 or Windows® CE), one or more application programs 36, other program modules 37 and program data 38. A user may enter commands and information into the personal computer 20 through input devices such as a keyboard 40, digitizer (e.g., a rich ink-compatible tablet) 41 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. For example, in a handheld device, the display 47 may be a touch-sensitive display, essentially combined with the digitizer 41. In addition to the monitor 47., personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, br portions thereof, may be stored in the remote memory storage device. It will be appreciated that the network connections shown are exemplary and other means of establishing a communications link between the computers may be used.

Universal File Format for Digital Rich Ink Data

Generally, rich ink technology stores information about stylus, mouse, or other pointer movements such as in vector information (magnitude and direction), along with enhanced information such pen width, color, pressure, timing, strokes, angle of stylus, and the like. There are a variety of available rich ink formats, and the additional information that each format can store with the pointer movements varies for the different formats. Throughout this disclosure, the data produced via a rich ink mechanism that includes information about stylus, mouse or other pointer movements and/or any additional information is referred to as "digital rich ink data." In contrast, a document provided in a widely-accepted graphic format (e.g., GIF, BMP, TIFF, JPEG, PNG) is referred to as "image data," or "bitmap image data." Note that digital rich ink may itself become widely-accepted, however at present these other formats for storing image data are generally more prevalent, with interpreters for rendering images therefrom readily available. Moreover, the present invention is not limited to image data in formats that are widely-accepted at present, or even widely accepted, but rather provides for concealing digital rich ink in any other data and data format.

The present invention is directed to a method and system wherein rich ink data in at least one format (e.g., as digital rich ink data) is hidden among data in another format (e.g., image data). For ease of description, this application mainly describes the concealing of digital rich ink data in image data. However, other alternative formats are possible for the carrier of the concealed data, such as by encoding one type of digital rich ink data within another type, or within text-based formats, for example. As described below, when such a file is accessed, computing devices capable of handling digital rich ink data recognize and extract the digital rich ink data from the file, while devices incapable of recognizing the format are still able to render an appropriate display via the ordinary data.

Figure 2:
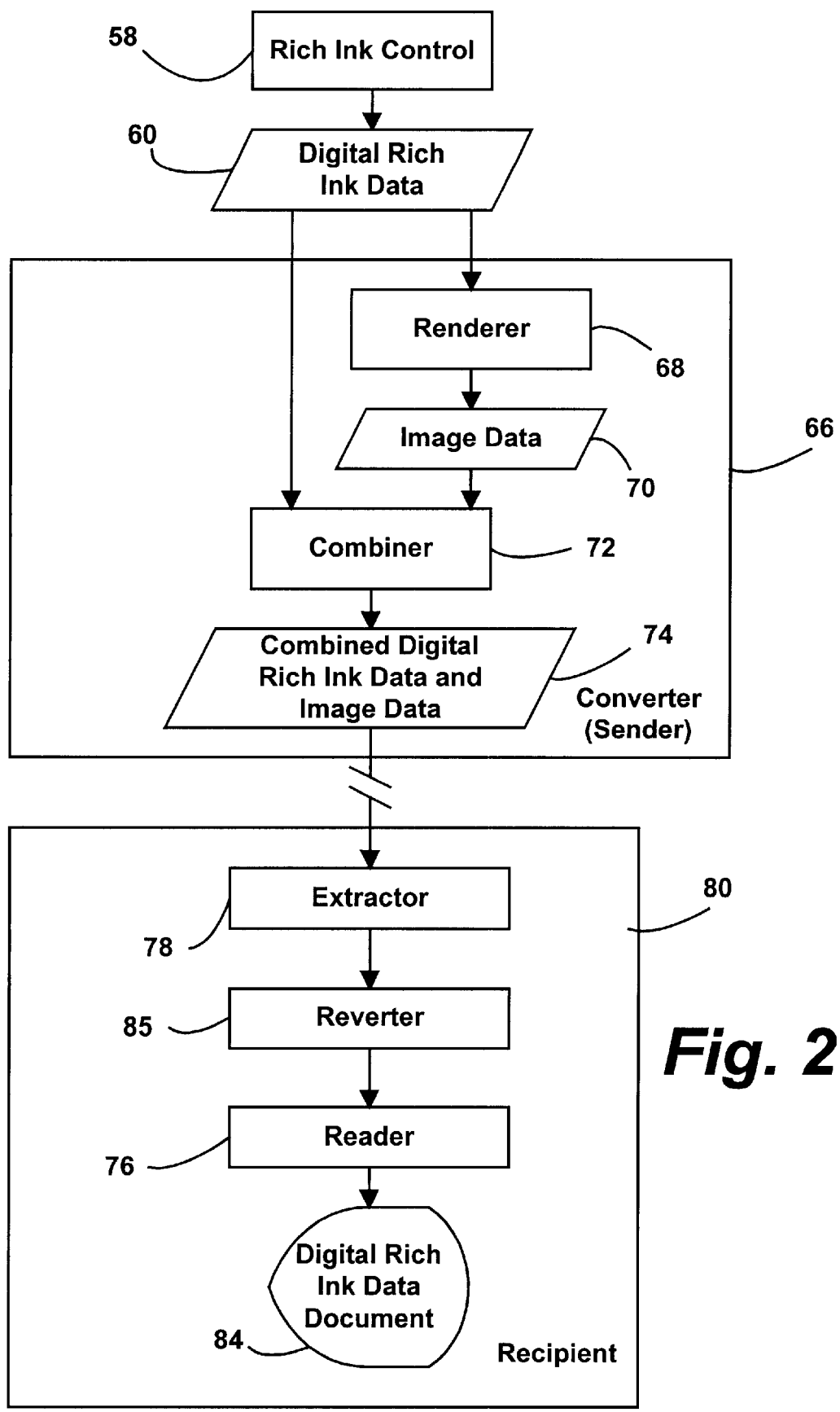
FIG. 2 is a block diagram representing a general architecture for combining digital rich ink data and image ink data into a file at a first computer, and extracting the digital rich ink data from the file on a remote computer, in accordance with one aspect of the present invention.
Figure 3:
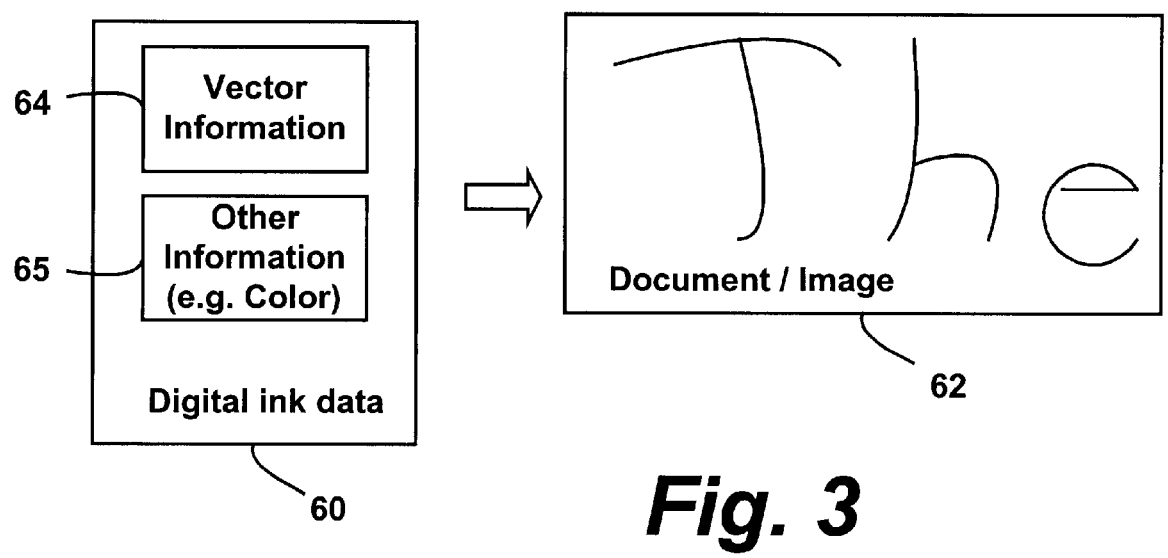
FIG. 3 is a representation of a digital ink file and a drawing corresponding thereto.

Turning now to the drawings, FIG. 2 shows generally an architecture for forming an image data file from digital rich ink data, e.g., in a document, and combining that image data file with the digital rich ink data. A rich ink control 58 is utilized to create a rich ink image, typically stored in a document, having digital rich ink data 60. One-rich ink control 58 may be Microsoft Corporation's Rich Ink control, however as can be appreciated, virtually any such mechanism for converting user pen movements to rich ink data will suffice. By way of example, a simplified representation of a document 62 formed via a rich ink control 58 is shown in FIG. 3. The document 62 shown in FIG. 3 represents the handwritten word "The." The digital rich ink data 60 formed from the document 62 includes vector information 64 and other information 65, e.g., color, pressure and so forth.

In accordance with one aspect of the present invention, there is provided a converter 66 (FIG. 2) for combining the digital rich ink data 60 with other data. In the present example, the other data is provided by encoding the digital rich ink data 60 into a widely-accepted image data format 70, e.g., a bitmap (BMP) file, GIF file, TIF file and so on. The rich ink control 58 provides the digital rich ink data 60 to the converter 66. For example, the converter 66 may include a renderer 68 that converts stored digital rich ink data 60 into an image, whereby the rendered image may be stored as the image data 70 in a widely accepted format, e.g., as a bitmap. Then, the digital rich ink data 60 and the image data 70 are provided to a combiner 72. As is described below, the combiner 72 conceals the digital rich ink data 60 within the image data 70 so as to provide a combined digital rich ink document 74.

The rich ink control 58 and the converter 66 may be implemented on a single machine (e.g., the personal computer 20), or the rich ink control 58 may be provided on a separate machine from the converter 66. For example, the rich ink control 58 may be located on a hand-held personal computing device, and the digital rich ink data 60 from the hand-held device may be downloaded to a desktop personal computer in which the converter 66 is located. The renderer 68 and the combiner 72 may also be provided on the same or separate machines, and their respective functions may be performed by a single device-or by several devices. In general, as described herein, virtually any of the components may be combined into common components, separated into separate components, and/or implemented on the same or different machines without departing from the spirit and scope of the present invention.

Figure 4:
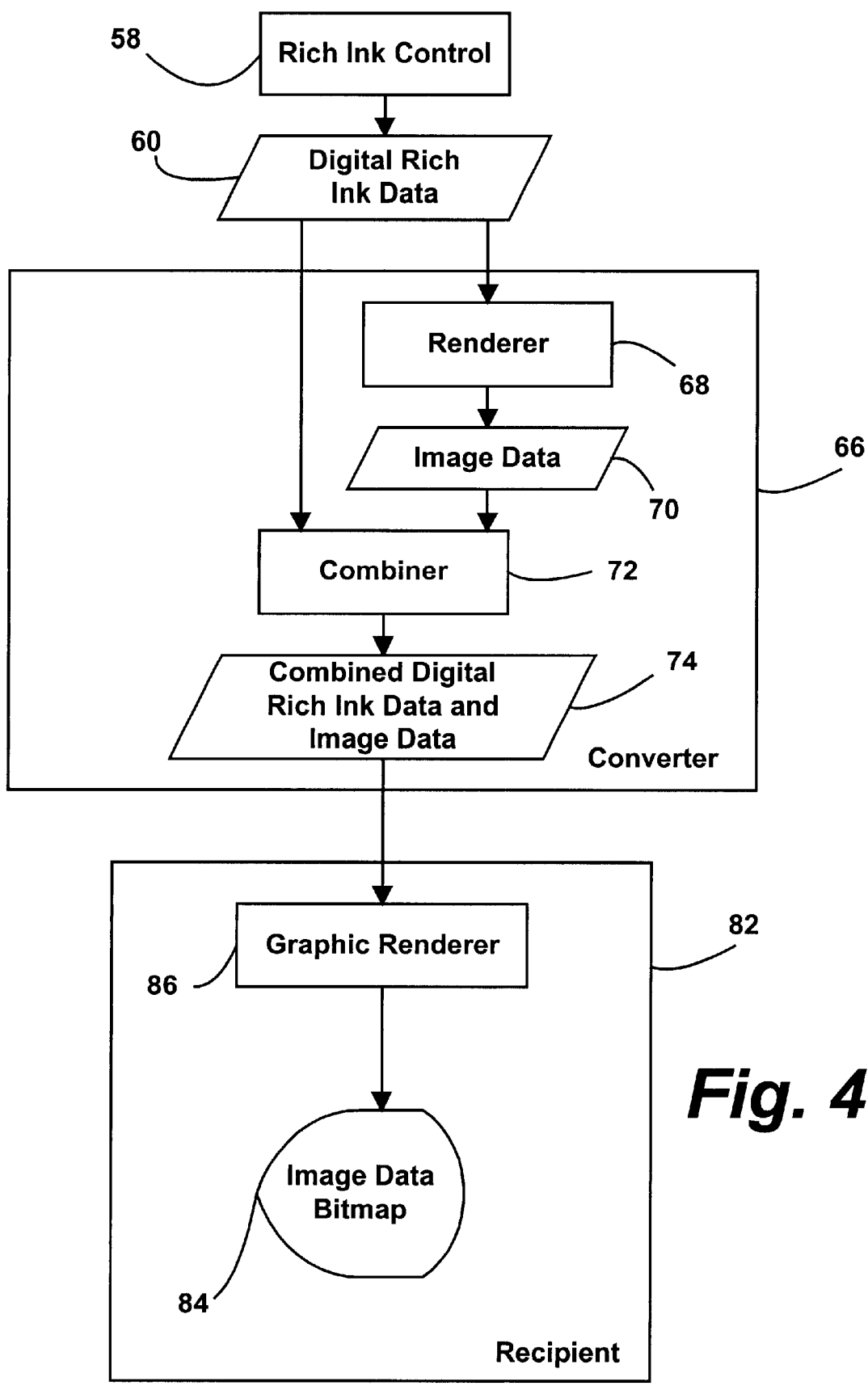
FIG. 4 is a block diagram representing a general architecture for combining digital rich ink data and image ink data into a file at a first computer, and rendering an image from the file on a remote computer that does not have a rich ink compatible reader.

Some time after the data is combined, the combined digital rich ink/image document 74 is transmitted or otherwise provided (e.g., via floppy disk) to a remote machine or application thereon, e.g., on the remote computer 49. If transmitted, the transmission may be in virtually any manner, for example through a network, the Internet, via e-mail or so forth. FIGS. 2 and 4 show two examples of recipient applications 80, 82 which may receive the combined digital rich ink document 74, wherein the application 80 includes a rich ink-compatible reader 76, while the application 82 does not. As is described in detail below, when the combined digital rich ink document 74 is accessed by the "rich ink-aware" application 80, the rich ink-aware application 80 recognizes and extracts the digital rich ink data 60 from the combined digital rich ink document 74. In contrast, when the combined digital rich ink document 74 is accessed by the "non-aware" application 82, the non-aware application 82 is incapable of recognizing the digital rich ink data 60 format, but is still able to display the ordinary image data 70. Note that the non-aware application 82 does not include a rich ink-compatible reader. Instead, a graphic format renderer 86 is utilized that renders a bitmap of the image data 70 (e.g., on a monitor 84 or a printer or the like). In keeping with the invention, because the rich ink data 60 is hidden, the rich ink data will not affect the non-aware application's ability to render the image. This provides the ability too use combined rich ink and widely-accepted image formats without having to update the large base of existing, non-rich ink-compatible image rendering engines.

The rich ink-aware application 80 shown in FIG. 2 includes a similar rich ink-compatible reader 76 and an extractor 78. The extractor 78 receives the combined digital rich ink document 74, recognizes that there is hidden digital rich ink data 60 in the digital rich ink document, and extracts the digital rich ink data from the image data 70. The rich ink-compatible reader 76 may then render an image via the digital rich ink data 60, e.g., on a display such as a monitor 84. The digital rich ink data 60 is also available for recognition, editing or other improvements thereto, for example, higher resolution enhancement, smoothing, alteration of individual elements, and so forth. A recipient application or device may also include a reverter 85, the function of which will be described below.

Figure 5:
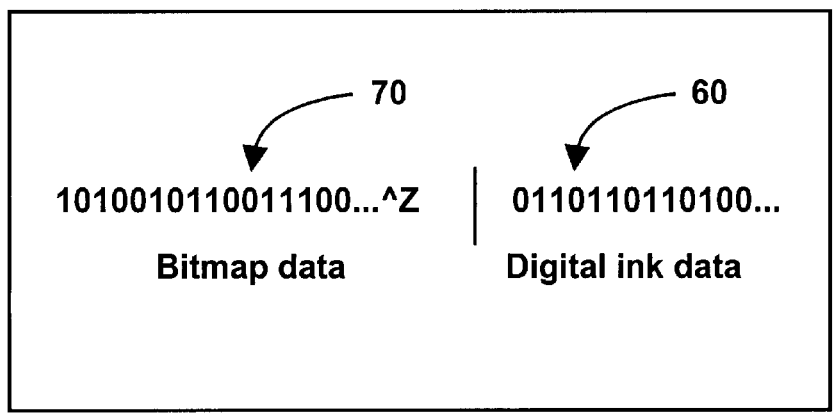
FIG. 5 is a representation of a method used to conceal the digital rich ink data in an image ink data file by appending digital rich ink data after the logical end of the file.

There are a variety of ways that the digital rich ink data 60 can be concealed within the image data 70 so that among other things, it will not adversely affect how a non-aware application reads the file. One method is shown in FIG. 5, wherein the data format for the image data 70 includes a defined logical end of file, designated by the symbol control-Z ("^Z") in FIG. 4. To create the combined digital rich ink document 74, the combiner 70 appends the digital rich ink data 60 after the logical end of the file, i.e., after the "^Z" symbol.

As discussed above, a user may desire to send the combined digital rich ink document 74, via e-mail or the like, over the Internet or over some other server or transmission service. It is possible that some intermediate transmission service may search for a designated end of a file and, if found, truncate the data thereafter before the file is forwarded to the next intermediate transmission service or the final destination. If such an intermediate transmission service is located between the converter 66 and the rich ink-aware application 80, and truncates the extended digital rich ink data, then the rich ink-aware application can handle accordingly, such as by instantiating the appropriate widely-accepted graphic renderer and passing the remaining data thereto to render an image. The digital rich ink data may also be concealed within the document by other methods, e.g., the methods described below, to minimize the possibility of truncation.

Figure 6:
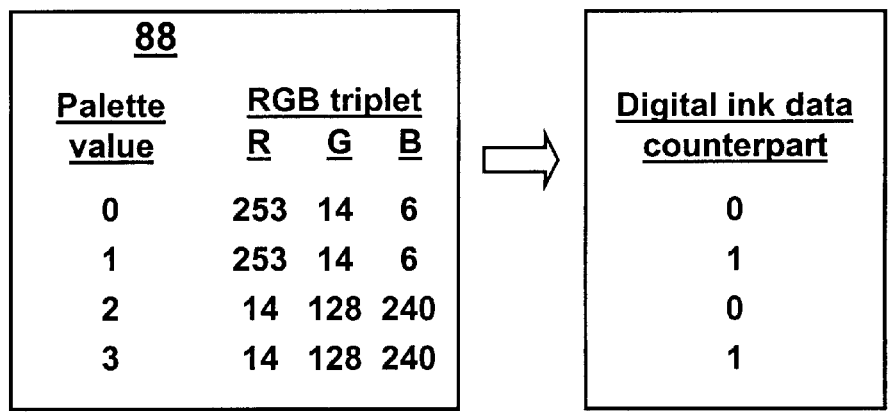
FIG. 6 is a representation of an alternate method for concealing digital rich ink data, via indexes to a color lookup table.

FIG. 6 shows another method for forming a combined digital rich ink document. In the example shown in FIG. 6, a color lookup table (palette) 88 is used to determine the actual color values for pixels to display the bitmap of the image data 70. As is known, a color palette is a lookup table that converts a color number index stored for each pixel of an image into multiple color component settings that can be displayed by a monitor. The components are normally RGB triplets or another color scheme (e.g., CMYK, HSV, or the like). The palette includes a block of fast RAM which is addressed by the pixel color input and whose output is split into the color (e.g., red, green and blue) levels which drive the actual display. A common example would be a palette color lookup table of 256 logical colors (i.e., addressed by eight-bit pixel values) where each color in the palette can be chosen from among approximately 16.7 million colors, e.g., eight bits output for each of red, green and blue.

In the example shown in FIG. 6, a palette of 256 colors is used, but adjacent logical entries in the palette table (e.g., zero and one, two and three, four and five, etc.) map to identical RGB triplet values. As such, only 128 distinct colors are available for displaying an image, however this serves adequately for most images. The use of a particular logical entry (e.g., an even logical entry such as zero or two) indicates a particular bit value (e.g., zero) for the hidden digital rich ink data file, while selecting an odd number to represent the color indicates the other bit value (i.e., one). In other words, if an eight-bit pixel value is used to designate the logical color entry, the bit value for the hidden digital rich ink data 60 is able to be represented by the least significant bit value in the byte.

As can be understood from this example, the information regarding the logical color palette entry is effectively saved in the first seven bits (the more significant bits of information) of the eight bit value for the logical color palette entry, because a change in the eighth bit does not alter the ultimate RGB output values. For example, if two is chosen as the index for a desired color, the last bit in the eight bit pixel value is zero (00000010b, where lowercase "b" indicates binary). Likewise, if-the index three for the same output color is chosen, the corresponding digital rich ink data bit is "1b," since that is the last bit in the eight bit pixel value of 00000011b). However, a widely-accepted rendering engine will simply interpret the pixel value by treating it as a normal index, whereby the correct color level will be output on the monitor. In the example of FIG. 6, the RGB triplet values for the stored color values for two and three are both 14, 128 and 240, whereby the choice at the encoding end conceals the rich ink data for later extraction.

In the above example, digital rich ink data information was concealed within the choice of the index to the color palette such one bit of information was capable of being stored for each pixel of information in the bitmap. However, not all of the entries needed to have rich ink information therein. For example, if more than 128 colors were needed for an image, only for example, the first half of the palette may store RGB pairs, enabling 64 plus 128 colors. As can be appreciated, any number may be used, since the extractor may recognize when information is concealed based on the number of pairs, e.g., only the first twenty are duplicates, and thus values between zero and nineteen have concealed digital rich ink image data therein. Also, as described in further detail below, the digital rich ink data could be hidden within the first few lines of the logical dolor entries for the bitmap image, the last few lines, and so forth. The combiner 72 and extractor only need commonly agree on the manner in which the digital rich ink data 60 is concealed into the image data 70.

For example, as another alternative embodiment, more than two logical color entries could share the same RGB values in the palette. For example, eight logical color entries could each correspond to the same RGB value. In this example, the information regarding the color palette entry is effectively saved in the first five bits (the more significant bits of information) of the eight bit value for the logical color palette entry. If the entire palette was grouped into such sets of eight, thirty-two distinct colors are available. The digital rich ink data is thus allotted three bits of information for each pixel in this example (the sixth, seventh and eighth bits of the logical color entry). Additionally, if desired, some bit values can be shared by the logical color entry and the digital rich ink data information. As can be readily appreciated, a variety of different color index/digital rich ink data combinations can be used, even in the same image.

A problem with the previously described examples is that there is a tradeoff between the number of colors and the amount of digital rich ink information that may be encoded. One way to compromise is to convert to lesser-numbered color palettes (e.g., a 256 color to a 16 color palette) before concealing, however as can be appreciated, image quality may suffer. Thus, another way that may overcome this difficulty for certain images is to have the combiner/extractor agree to use the most prevalent color or colors for concealing information, since more pixels will have those colors. For example, an image may have 230 colors, but most of the pixels are white background. Thus, in this example, twenty-six different values for white pixels may be used to conceal digital rich ink data, and since a lot of white is present in the image, a lot of the digital rich ink information may be stored. In other words, because the background color is likely to be often represented in an image data file, there may be enough background within the image to hide the necessary digital rich ink data. Two, three and so on prevalent colors may be alternatively used, as long as the extractor knew or can figure out what scheme the combiner employed.

Figure 7:
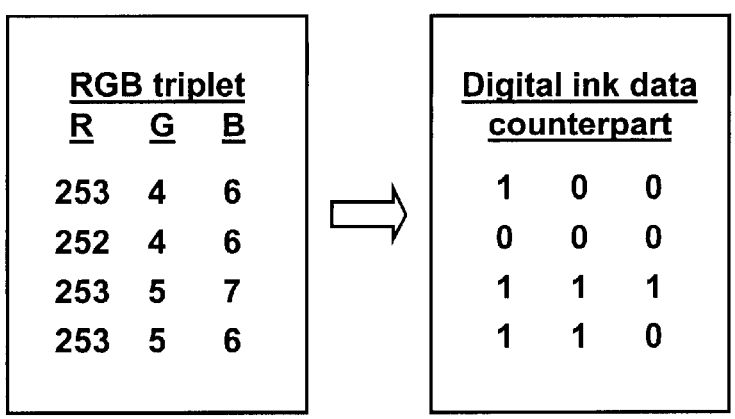
FIG. 7 is a representation of an alternate method by which to conceal digital rich, ink data in the image ink data, in which RGB triplets are slightly varied to encode the digital rich ink data.

In accordance with another aspect of the present invention, digital rich ink data may alternatively be concealed in other color schemes, such as 24-bit "True" color schemes. For example, if RGB components are used in a 24-bit color model, slight variations for the R (red), G (green), and/or B (blue) values may represent data for the digital rich ink data 60. FIG. 7 shows an example in which RGB triplets are used to define color values for the pixels of an image data file. In 24-bit color schemes, each of the colors is stored as the full RGB byte triplet, giving 16.7 million different possible color combinations in the same image. Because an ordinary observer typically cannot detect slight variations in color values, slightly different color values may be used to represent different data information for the digital rich ink data 60. For example, odd values for one (or all three) of the RGB triplets could represent a "1", while an even values for the RGB triplets could represent a "0".

Examples of RGB triplet values using this odd=1, even=0 logic, and the resulting digital rich ink data bit values, are shown in FIG. 7. FIG. 7 shows four different RGB values, each of which are close in proximity, but are only slightly, if at all, visually different to an observer when output. Using the logic described above, the four RGB values shown in the drawing each represent a different three-bit set of data that can be used for the digital rich ink data information. For example, the RGB value "252 4 6" includes three even numbers, and thus the resulting three bits of information for the digital rich ink data is "0 0 0". In contrast, the RGB value "253 5 7" includes three odd numbers, and thus the resulting three bits of information for the digital rich ink data is "1 1 1". As with the examples shown and described with reference to FIG. 6, the bits of information for the digital rich ink data 60 could be represented by the least significant (i.e., eighth) bit for each color value R, G, and B.

As can be readily appreciated, variations in the odd/even values of the RGB triplets allows up to eight different combinations of three-bit values that can be used for the digital rich ink data information. The combiner 72 can assign appropriate values for the pixel information for the image data 70 so that the pixel information appropriately hides the digital rich ink data 60 in this manner.

Figure 8:
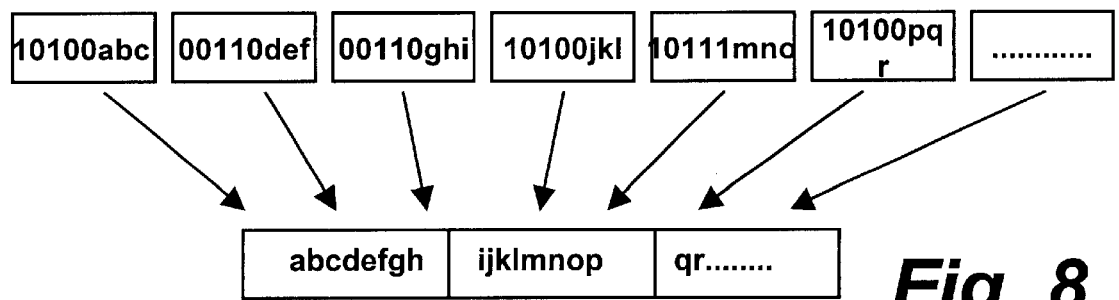
FIG. 8 is a representation of an alternate method by which to conceal digital rich ink data, by storing the digital rich ink data within the least significant bits of 24-bit bitmap image data.

The example in FIG. 7 could be varied so that the particular value for a color (R, G, or B) is effectively represented by some other number of more significant bits for the eight-bit value for the color. For example, the most significant five can be used for the color, while the three least significant bits slightly vary the color while representing the digital rich ink data. An example of a string of eight bit values is shown in FIG. 8, wherein letters represent bit values (zero or one) of the digital data. Each of the eight-bit values includes a first five bits of logical color information (e.g., "10010"), and is followed by three bits of information that are used to define a portion of the digital rich ink data (in FIG. 8 designated by the characters "abc", "def", "ghi", etc.).

If the string of eight-bit values shown in FIG. 8 was accessed by an application that is not capable of reading digital rich ink data (e.g., the non-aware application 82), then the full eight bits will be used. This will provide an image that is close to the original image without the concealed data, although the color will be varied to an extent. However, if an application that is capable of reading digital rich ink data, the application recognizes that the digital rich ink data is hidden within the eight-bit values, and extracts that data. The extractor 78 concatenates the extracted data and arranges it into a usable order (e.g., bytes, as shown in FIG. 8), so that digital rich ink data is available for rendering or editing, enhancing and so forth.

As with the previous examples described above, the digital rich ink data 60 may be hidden at any location in the bitmap image data file, as long as the extractor 78 knows or can otherwise determine the location or locations. For example, the hidden digital rich ink data could be hidden in the first few lines or last the lines of a bitmap image, in a background color, such as triplets that produce a color close to white, or in all or any part of the bitmap image.

Figure 9:
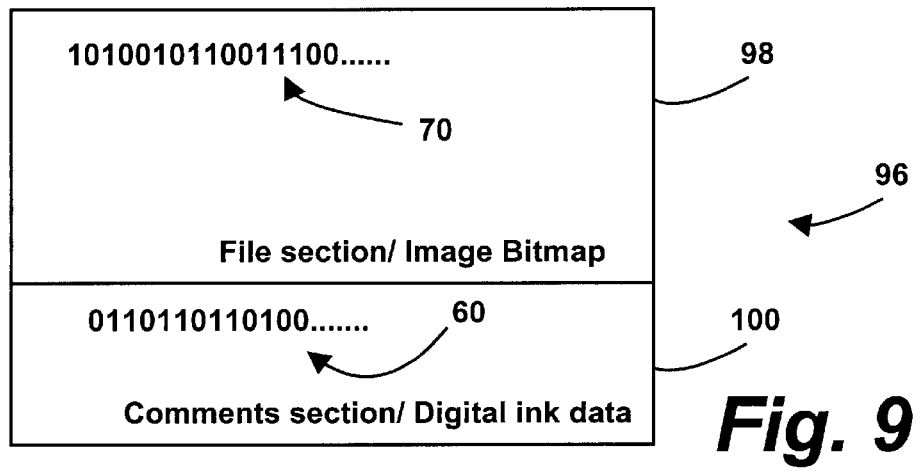
FIG. 9 is a representation of another alternate method for concealing digital rich ink data, in which the digital rich ink data is included within a comments section of the file of the image ink data.

As another way to conceal data, some image formats provide the ability to include comments or other information. If such an image format is used, then the combiner 72 may place the digital rich ink data 60 in one or more comment sections. For example, as shown in FIG. 9, a document 96 includes a file section 98 and at least one comments section 100. The combiner 72 places the image data 70 in the file section 98, and the digital rich ink data 60 in the comments section 100. When the document 96 is received by the recipient, rich ink-aware application 80, the extractor 78 determines whether there is digital rich ink data 60 in the document 96. After the digital rich ink data is found, (which may be distinguished from other comments by a certain format, described below), the digital rich ink data is extracted from the comments section 100 and then rendered by the rich ink compatible reader 76. If the document 96 is received by the recipient non-aware application 82, then the image data 70 is rendered by the graphical renderer 86, which ignores comments.

Figure 10:
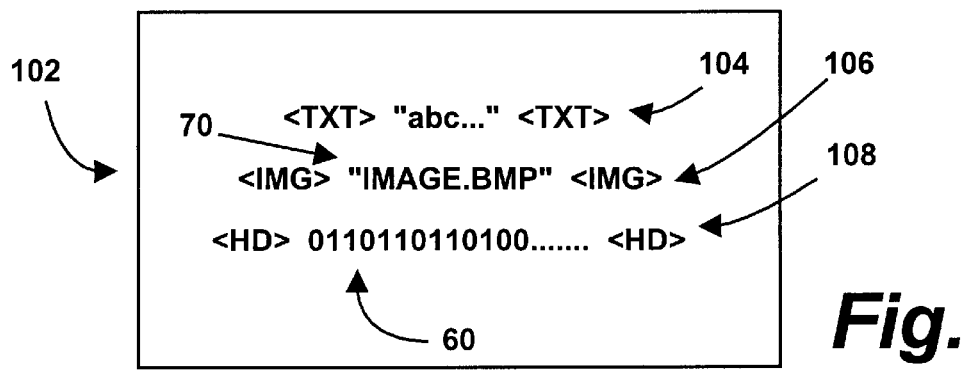
FIG. 10 is a representation of another method by which to conceal digital rich ink data in the image ink data, in which the digital rich ink data is contained within extra data tags of an HTML file of the image ink data.

Other image formats (e.g., HTML) provide extra data tags so that data that is not a part of the file can be attached to the file. An HTML example of an image format 102 providing extra data tags is shown in FIG. 10. The image format 102 includes a text section 104, a bitmap section 106, and an extra data section 108. The image data 70 is provided in the bitmap section 106 (e.g., "IMAGE.BMP"), and the digital rich ink data 60 is provided in the extra data section 108. When the document 102 is received by the rich ink compatible application 80, the extractor 78 recognizes that the digital rich ink data 60 is within the document, and extracts that digital rich ink data from the extra data section 108 so that it can be utilized by the rich ink compatible reader 76. If the non-rich ink compatible non-aware application 82 is utilized, then the image data 70 within the bitmap section 106 is rendered, along with any text images contained within the text section 104 (e.g., "abc . . . "); The use of the text images with the image data 70 is described in further detail below.

When the extractor 78 removes the digital rich ink data 60 from the combined digital rich ink document 74, the extracted data is recombined to recreate the original data. For example, as shown in the bottom of FIG. 8, extracted bits abc, def, ghi, jkl, mno, pqr and so on may be arranged in order so as to form bytes (abcdefgh, ijklmnop, and so on). The extractor arranges the digital rich ink data 60 in an order that matches the data order before the combiner 72 merged the digital rich ink data 60 with the image data 70.

In accordance with another aspect of the present invention, the data extracted from the combined digital rich ink document 74 preferably includes a standardized file format so that many applications from different vendors, different versions and so forth understand the way in which the data is stored. The file format standard also preferably includes a data integrity check.

Figure 11:
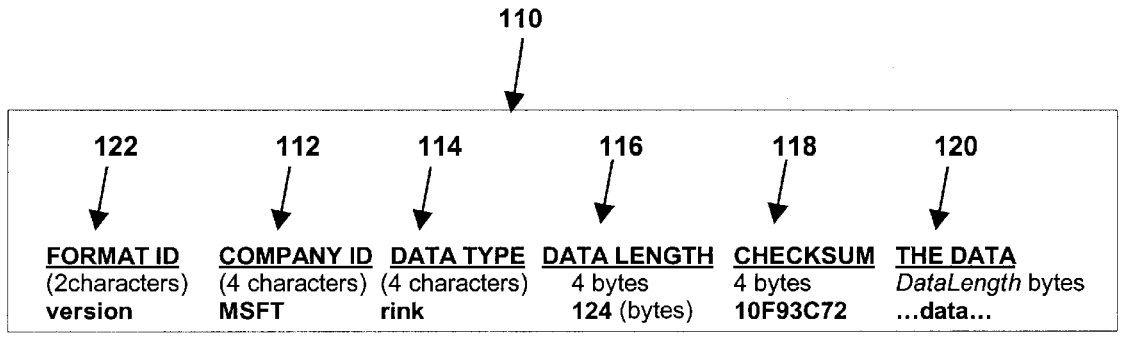
FIG. 11 is a chart providing a standardized format for arranging digital rich ink data.

In the embodiment shown in FIG. 11, the file format structure includes a header 110 at the beginning of the extracted digital rich ink data 60. The file format header record 110 includes a number of different fields, four of which in the present example include company ID 112, data type 114, data length 116, and checksum 118. The file format directory 110 is followed by the appropriate number (data length) of bytes of the actual dataset 120 that makes up the digital rich ink document.

The company ID 112 includes a brief description of the group that employed the digital rich ink document, in this example, Microsoft® Corporation (indicated by the characters "MSFT"). The company ID in this example is described using four characters (4 bytes). The data type 114 includes information regarding the type of data that is included in the data set 120'. As described above, rich ink data may be formatted in different ways. In this example, the data type is indicated by the characters "rink," which indicates that the data is formatted according to a digital rich ink data standard. If a different data format (e.g., metafile data structure "meta," a Word drawing object data structure "wobj") is concealed within the image data 70, that data format is instead designated in this field. The data type 114 is presently described with four characters (4 bytes).

The data length 116 includes a number that indicates the length (number of bytes) of the dataset 120. In the example shown, the data length 116 is allocated four bytes of the file format directory 110. Next, as is known, a checksum 118 provides a rapid and straightforward integrity check of the data set 120. In the example shown, the checksum 118 is allocated four bytes of the file format directory 110.

In addition to the above fields, the file format directory 110 may include a format ID 122, comprising information regarding the version and/or the actual methods to be performed upon the dataset 120. In the example shown in FIG. 12, the format ID 122 is allocated two bytes of the file format directory 110. The information within the format ID 122 may alternatively be provided within the dataset 120, or may be implied through the bytes-per-entry values of the fields (collectively or individually) for the file format directory 110. If the format ID information is implied, it is assumed that future versions will increase the size of the directory entries to add new values or more information, along with some way (e.g., field separators) to recognize the separate fields. Rich ink aware applications will preferably be backward-compatible. Old code may even be forward-compatible by ignoring parts of future file format headers, e.g., optional comments storing information such as time and date stamps, author, copyright information, and so forth.

In an alternative implementation, one or more types of hidden data formats of the rich ink data may be stored within the same image data. For example, in addition to digital rich ink data, metafile data and/or word drawing object data could be stored within the same image data 70. To this end, each of the multiple types of hidden data are preferably combined with the image data 70 as described above, (e.g., by using a converter 66).

In this alternative format, the extracted data includes a directory-type header 128 (FIG. 12) having the information described above with reference to the file format header 110 for each of the data formats. The directory header shown in FIG. 12 includes control data 130, comprising information regarding the number of directory entries, the bytes-per entry (e.g., the number of bytes allocated in the directory to each entry), and an end-of-data offset. The end-of-data offset is a number indicating the last character of the combined data, including the directory header, the directory 128, and the actual data for each of the data format types.

The control data header 30 is followed by a first directory entry 132 that includes, for each of the types of hidden data format types, information similar to the information described above with respect to the file format header 110. That is, the directory includes a company ID, data type, and checksum for each of the data types. However, since the data for multiple types will appear to be a continuous stream of data, instead of having a single data length, a data offset value is provided to identify individual blocks of each type. The data offset provides the number of bytes into the block of data that the first byte of its corresponding data type begins. As described above with respect to the data format header 110, the directory may also include format ID information, or this information may be implied from the directory structure itself, (e.g., via the bytes per entry), or may be provided within the actual dataset.

Figure 12:
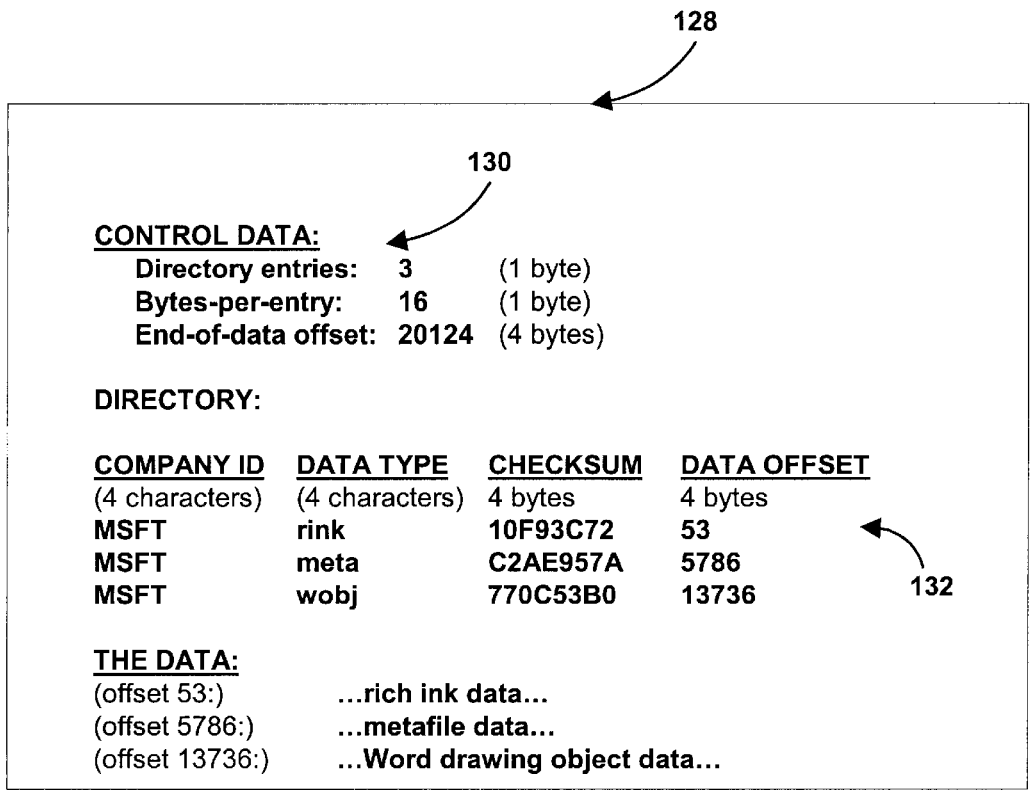
FIG. 12 is a chart providing an alternate standardized format for arranging (possibly) multiple sets of digital rich ink data.

As can be understood from FIG. 12, a significant amount of information regarding the digital rich ink data within the document can be readily determined from the directory header 128. For example, the number of bytes used for the directory header is six, and the number of bytes used for the directory 132 is forty-eight, i.e., the number of directory entries (three) times the bytes-per-entry sixteen, (16×3=48). The first data offset is equal to the combination of these two amounts, i.e., fifty-three, (the sum of fifty-four minus one, since zero based). The total size of the rich ink data is equal to the end-of-data offset, and the size of any data block ("block n") may be obtained by calculating (Data offset (block n+1)—Data offset(block n)), or (End-of-data offset—Data offset(block n)) for the last block. In this manner, the directory 128 shown in FIG. 12 provides a structure so that a variety of different data formats of the same document (e.g., a digital rich ink document) can be stored with the image data 70.

In a document having multiple data formats, the recipient and the extractor 78 may include interfaces to permit the recipient application (or user) to iterate or enumerate through the available data formats until a data format is found that can be read. For example, after the digital rich ink data 60 and other data types are extracted from the digital rich ink document 74, the extractor 78 first offers a list of the available data types to the recipient (e.g., the remote computer 49). The recipient then selects a preferred one in the list that it understands, and the extractor 78 returns that type of data.

To assist applications or users in selecting, the hidden data format types may be stored in some order of desirability. For example, the extractor may first offer or list the most desirable data format (e.g., digital rich ink data 60), and if the remote computer 49 does not include a reader for the offered format, then a second data format is offered (e.g., metafile data). This process continues until a data format is offered that the remote computer 49 can read. It is possible that the only reader that the remote computer 49 can offer is a graphic image renderer, such as the renderer 84 of the non-aware application 82. If this is the case, then the image data 70 will be utilized by the remote computer 49.

The multiple data format structure described thus far may also offer the benefit of data redundancy. For example, in the directory structure shown in FIG. 12, the digital rich ink data file, the metadata file, and the Word drawing object data file, and the image data file could all include different formats of the same information (e.g., the rich ink data). If there is an error in processing one data format (e.g., the metafile data is corrupt), then the remote computer 49 or user may re-request the data in an alternative format (e.g., Word drawing object data) to attempt to displaying the newly-requested format.

Of course, the above examples given are nonlimiting, and serve to illustrate one embodiment of the present invention. In practice, a directory structure may be significantly altered, e.g., the length and offset may be stored as a different number of bytes, a directory entry may be present for Microsoft Corporation's compound document structure or FORMATETC structure, and so forth. As can be readily appreciated, many other variations are possible.

Regardless of the format used, a document created by a rich ink control is not necessarily formed into a single image data bitmap by the renderer 68. For some documents, the renderer 68 breaks the digital rich ink data 60 and other portions of the document (e.g., text and graphic shapes, discussed in more detail below) into a number of individual sections or segments. The segments could be defined as desired by a developer. For western languages, a unit could be one word. In far eastern languages, a unit could be an ideograph or compound ideograph. Drawings are more complex, but a drawing "unit" may be the entire drawing, or may be just a single element such as a rectangle. For ease of description, segments within the document that include digital rich ink data are referred to in this disclosure as ink "units." The renderer 68 recognizes each ink unit to separately render an overall image.

Rich ink technology also allows conventional text to be interspersed with ink objects. Text in the document can be maintained in a text format (called "text runs") for a rich ink document. Rich ink within the document may be recognized by the rich ink control 58, and converted into text or into graphic shapes, such as rectangles. Sometimes the original ink is retained, even after recognition. This retained original ink could be placed in the digital rich ink document 74 by the converter 66.

Figure 13:
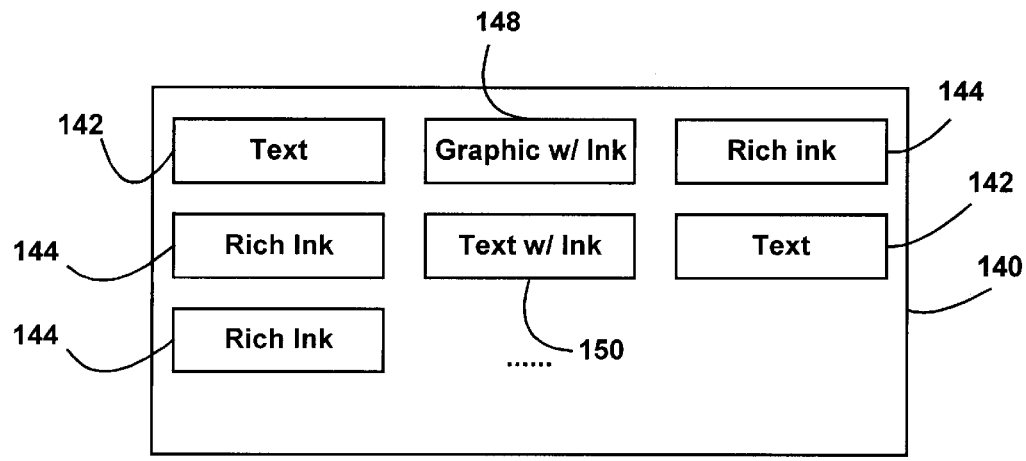
FIG. 13 is a diagrammatic representation of a rich ink document that includes text runs, ink units, and graphic shapes.

The rich ink control 58 typically separates the document into a plurality of segments. A segment can be an ink unit, a graphic shape, or text. When read by a rich ink compatible reader, this combination of ink units, text runs, and graphic shapes can naturally rewrap as the page size is changed through zooming, printing, or moving to a new device. An example of such a document 140 is shown in FIG. 13, in which text 142 and ink units 144 are included. The document 140 also includes graphic shapes 148 with retained ink, and text 150 with retained ink.

In accordance with one aspect of the present invention, the ink units, text runs, and/or graphic shapes are all supplied by the rich ink control 58 to the converter 66. As is described in detail below, the ink units are converted to images (image data 70) by the renderer 68. The graphic shapes may also be converted to image data 70, and the text can be maintained as a text run. The two main formats for transmitting text-and-graphics are RTF (Rich Text Format) and HTML. The following examples describe how ink units, graphic shapes, and text runs are handled by each of these graphic formats.

In an RTF document, each text run is prepared conventionally (using RTF to represent text is a well-known technique), specifying values such as text font and size, and noting paragraph marks. As the document is processed, ink units are encountered. For each of these, an image (i.e., image data 70) is prepared as described above, and the digital rich ink data 60 for the ink unit is concealed within the image data 70. The image data 70 is then inserted as an inline RTF graphic object. Preferably, the graphic object formed by the image data is properly sized in relation to the text, which can be done with reasonable fidelity in RTF. An image of a graphic shape is inserted in a similar manner. Processing then continues with the next ink unit, more text, a graphic shape, or a paragraph mark.

Preparing HTML documents that include graphics is also a well-known technique. The processing loop is similar to that described under RTF, i.e., the text stream is composed and output, specifying values such as text font and size, and noting important breaks such as paragraph marks. When digital rich ink data 60 is encountered, it is inserted as an in-line image. The bitmap image data 70 is saved as a separate, stand-alone file (such as "image1.bmp"), and an appropriate URL or other identifier (e.g., of a local drive) is inserted into the document, with instructions to treat the image data 70 as an inline image. For text that is entered on the rich ink control and recognized as being text, the text can be inserted under the ALT keyword (defined as an "alternative to the graphic for rendering in nongraphical environments"). Non-recognized digital rich ink data can be simply labeled as a "digital rich ink drawing", or the like. Settings would attempt to match the graphic to the text size, but since HTML allows for significant variations in this regard, there would be no guarantee that these would match well, when viewed elsewhere. Processing would continue with the next ink unit, more text runs, or a paragraph mark. The final dataset would then consist of the main HTML document and a collection of image files, all of which would need to be transmitted to the recipient.

The recipient can view, edit, and save edits of the document in several ways, depending on the amount of support the recipient has for graphics and rich ink. A recipient that does not have graphics capability, such as text-only HTML browsers, simple RTF readers, and the like, can successfully read the documents (that is, nothing will crash), but no graphic information will be viewable. Recognized text could still be viewed on HTML systems due to support for the ALT keyword, as described above, which is advantageous because it permits some specialized uses such as browsers for the blind or vision-impaired.

Figure 14:
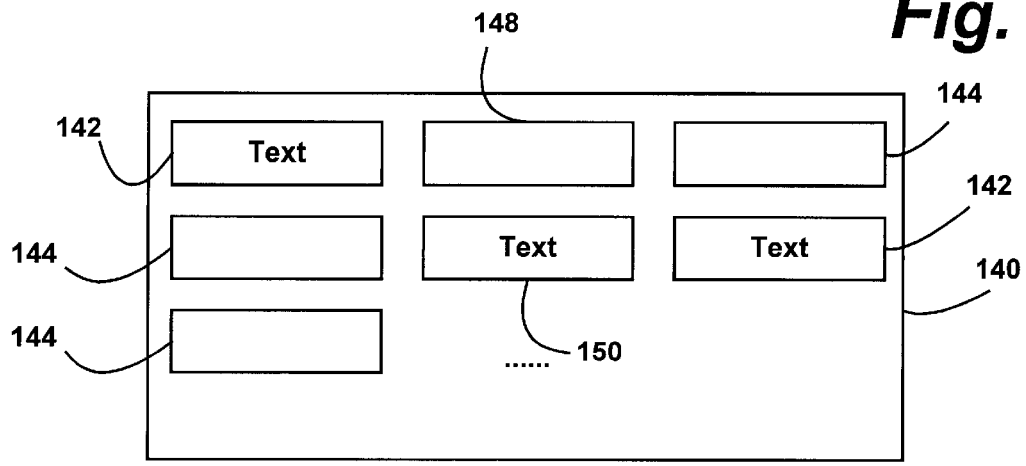
FIG. 14 is a diagrammatic representation of the rich ink document of FIG. 13, showing display of the document on a system that does not have graphics capability.

A diagrammatic representation of what may be shown from the document 140 on a recipient without graphics capability is shown in FIG. 14. Sections in which the viewer would see nothing (e.g., ink units and graphic shapes) are left blank.

Figure 15:
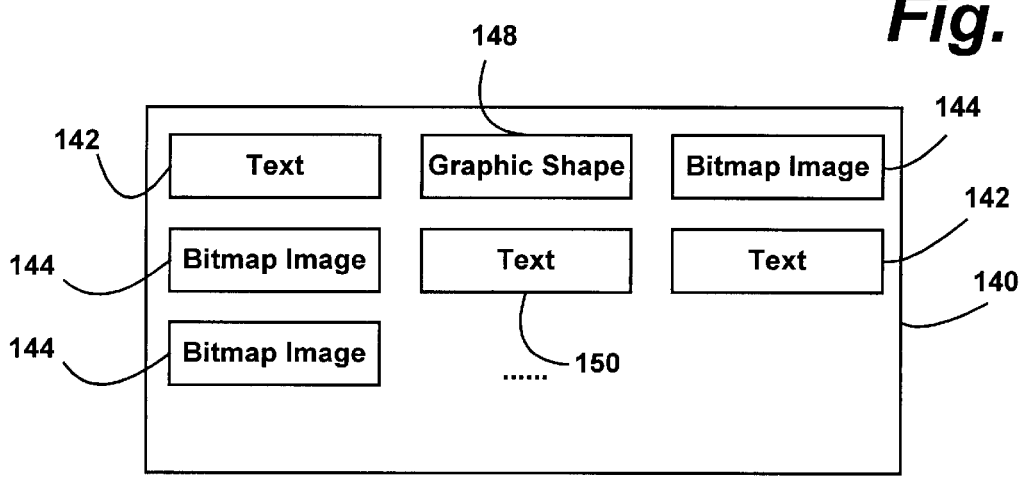
FIG. 15 is a diagrammatic representation of the rich ink document of FIG. 13, showing display of the document on a system that has graphics capability, but not rich ink capability.

On a system that has graphics capability, but no digital rich ink compatible readers, (e.g., it has only the non-aware application 82), the user sees a variety of bitmap scribbles, laid out in a linear fashion like words in a paragraph (see FIG. 15). These ink words wrap at the edge of a page, and may have text interspersed. The document should view and print properly, however, as mentioned above, under HTML the ink and text may not match in size on some viewers (or printers), but the linear ordering and basic information is still available. For editors, copy, paste, and delete would work correctly (secretly preserving the original ink, as the images were moved and pasted).

Figure 16:
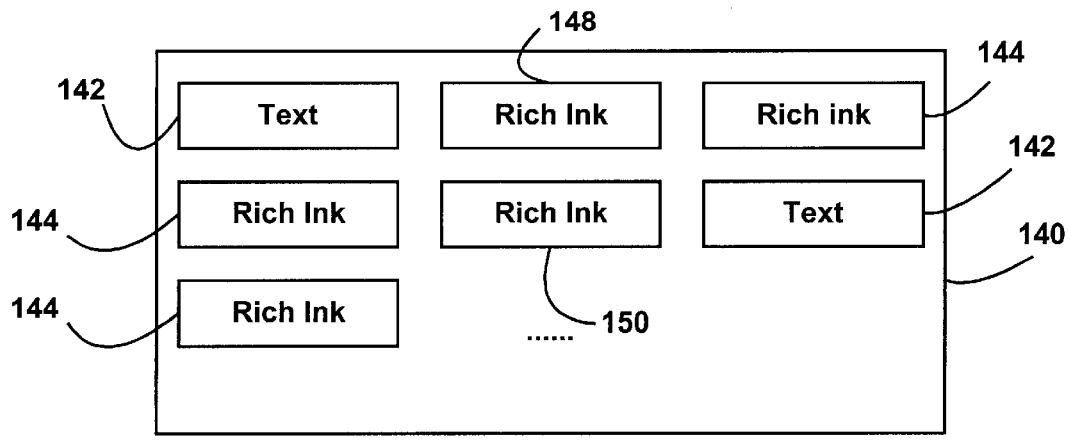
FIG. 16 is a diagrammatic representation of the rich ink document of FIG. 13, showing display of the document on a system that includes rich ink capability.

For a system that has some digital rich ink support (e.g., FIG. 16), the viewer includes the digital rich ink data extractor 78 and the rich ink compatible reader 76, and therefore is able to extract and view the digital rich ink data 60. As with a system without graphics capability, the ink scribbles are laid out in a linear fashion but, in this system, the viewer has extra information. (the digital rich ink data 60), allowing it to properly size the ink in relation to the text. This advantage provides a dramatically better image, since rich ink will often have much better resolution than the bitmapped graphic. Furthermore, ink lines can be resized, smoothed, and even anti-aliased. Such techniques are significantly cruder when applied to bitmapped images.

A more advanced system may include both the extractor 78 and the renderer 68, as well as the converter 66 (for ease of description, this system will be referred to as a "rich ink editor"). Such a system is able to render the ink-and-text document properly sized, as described in the previous example (e.g., with respect to FIG. 16). In addition, the user may perform format editing on each ink object, changing background color, ink thickness, bold, italic, strikethrough, and so forth. The user may also perform text recognition on each object. Finally, each of these edits could be saved to a separate file, preserving all of the original ink information.

At an advanced level, a system may include the extractor 78, the converter 66, the renderer 68, and the reverter 85 (FIG. 2). The reverter 85 permits the recipient application (e.g., the rich ink-aware application 80) to rejoin the segments created by the rich ink control 58. In this event, the document is no longer segmented as in FIG. 13, but instead returns to a single document, in the condition of the document originally formed on the rich ink control 58. This system is thus capable of reading in a ink-and-text email or HTML page, and converting it back to another (e.g., proprietary) ink format. The editor then provides the full functionality of a rich ink editor, including joining or splitting ink units, advanced recognition features, and so forth. The final document could be saved in either a native digital rich ink data format (for a significant size savings) or back in the input HTML or RTF format.

Note that saving digital rich ink data 60 in HTML or RTF are simply example implementations, as are the multiple levels of compliant viewers, described above. In practice, the techniques described herein may be applied to a wide variety of formats (such as graphic objects embedded into the native formats of many word processors), and may be implemented on a variety of different systems as desired for a specified application.

Figure 17:
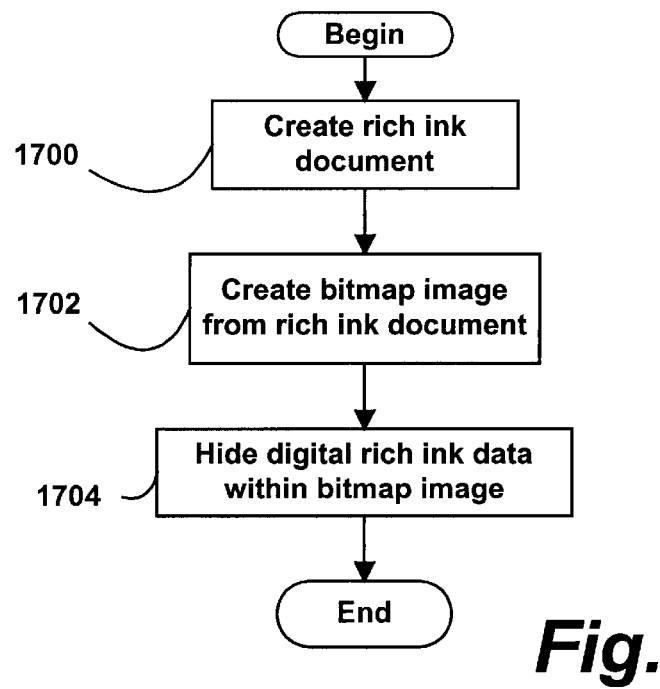
FIG. 17 is a flow diagram generally representing a process for concealing digital rich ink data within the image ink data in accordance with one aspect of the present invention.

Turning now to an explanation of the operation of the present invention, FIG. 17 shows the general overview of a process for concealing digital rich ink data within image ink data in accordance with one aspect of the present invention. Beginning at step 1700., a rich ink document is created (e.g., on the rich ink control 58). At step 1702, a graphic image is formed from the rich ink document, e.g., on the renderer 68. As described in detail above, the document tan be broken into segments of ink units, text and/or graphic shapes. If so, in step 1702 bitmap images are formed for each of the ink units, the text is inserted as text runs, and so forth as described above. The bitmap image, (e.g., the bitmap image data 70) is then formatted into a widely-accepted image format and merged with the rich ink document (e.g., the digital rich ink data 60) so as to form a combined document that includes, both the image data and the rich ink document (e.g., the combined digital rich ink document 74). In the example described above, the image data 70 and digital rich ink data 60 are combined in this manner by the combiner 72.

Figure 18:
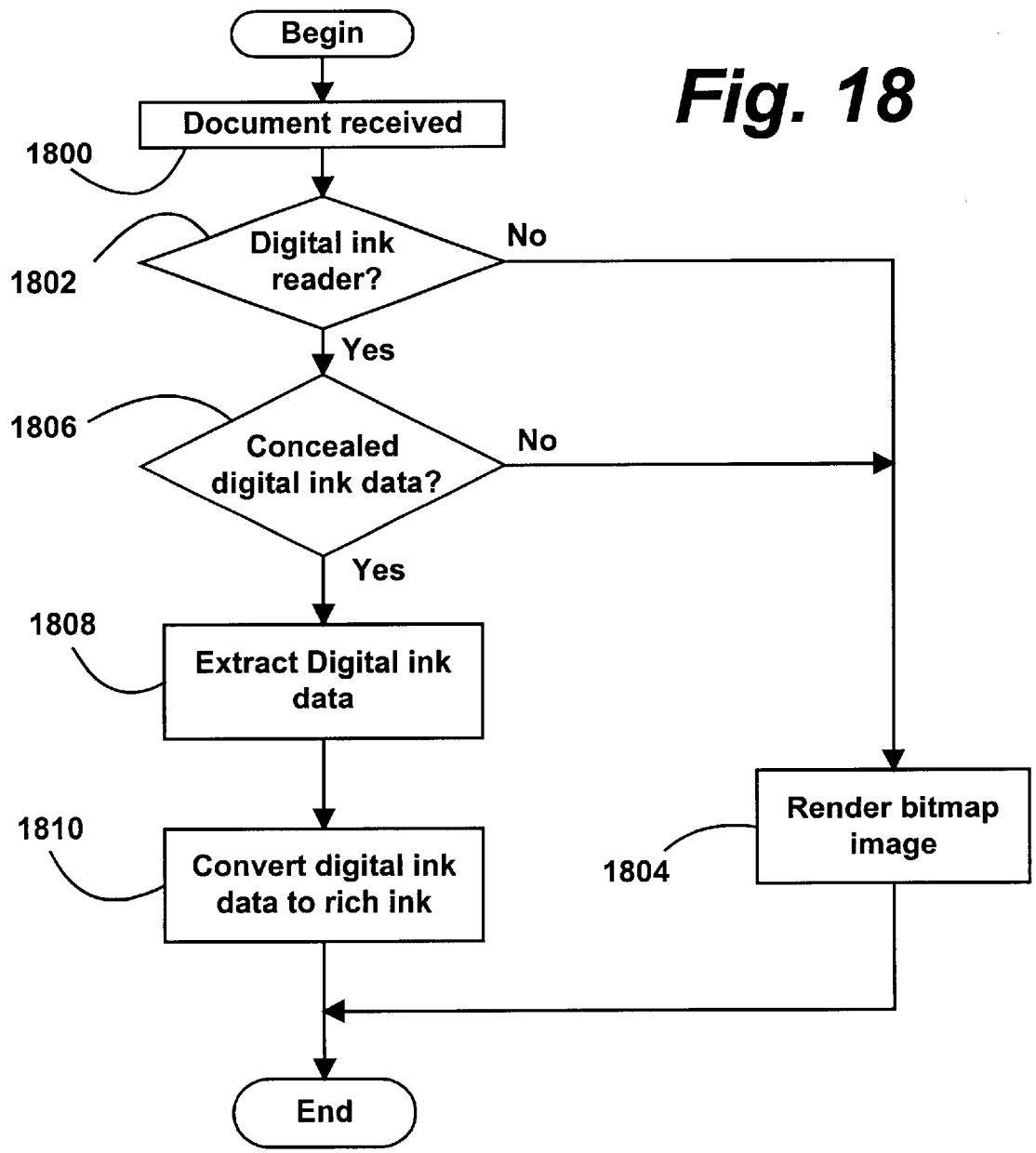
FIG. 18 is a flow diagram generally representing a process for reading the concealed digital rich ink data or the image ink data in accordance with another aspect of the present invention.

FIG. 18 shows a general overview of the process for reading either the concealed digital rich ink data or the image ink data. At step 1800, the recipient application or machine (e.g., the remote computer 49, the rich ink-aware application 80, or the non-aware application 82, or the like) receives the combined digital rich ink document 74 via e-mail or some other transmission service. At step 1802, a determination is made as to whether the recipient includes a rich ink-compatible reader (e.g., the rich ink-compatible reader 76). If not, then step 1802 branches to step 1804 where a bitmap image is rendered (e.g., on the graphic renderer 84).

If the recipient does have a rich ink-compatible reader, then step 1802 branches to step 1806 where a determination is made whether the document includes digital rich ink data. If not, then step 1806 branches to step 1804, where the bitmap image is rendered (e.g., on the graphic renderer 84). If the document does include digital rich ink data, then step 1806 branches to step 1808 where the digital rich ink data is extracted from the document, by the extractor 78, for example. The extracted digital rich ink data is then usable by the rich ink compatible reader, which then converts the digital rich ink data to a rich ink document at step 1808.

Figure 19:
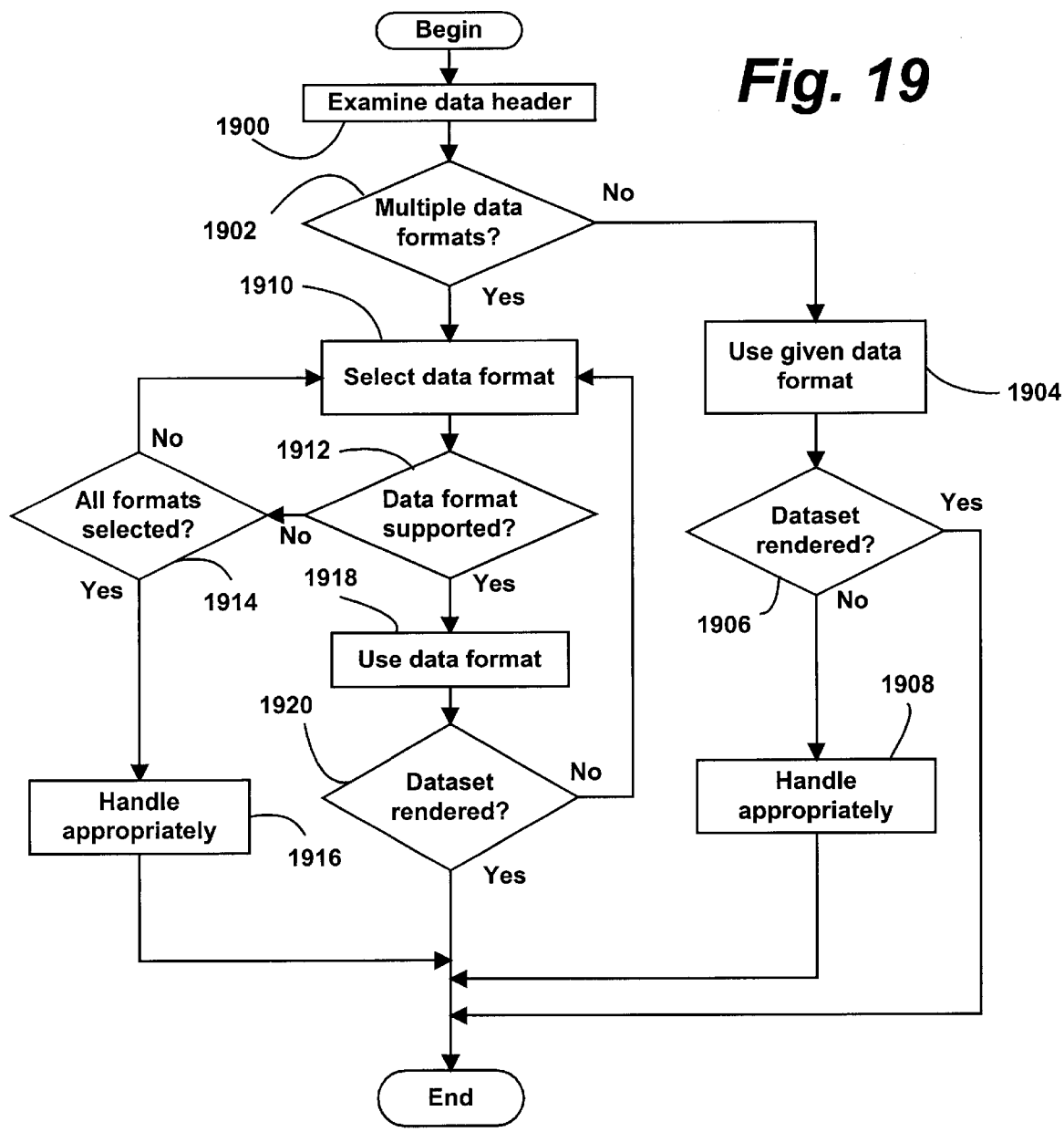
FIG. 19 is a flow diagram generally representing a process for determining a file format structure of the extracted data in accordance with another aspect of the present invention.

FIG. 19 shows a general process for determining a data format structure for the extracted data. Beginning at step 1900, the header of the extracted data is examined to determine the presence of a data format or multiple data formats (step 1902). This review can be made by the extractor 78, for instance. If only one data format structure is found, step 1902 branches to step 1904 and the single data format structure is used. The data format structure instructs the appropriate reader how to render or show the extracted dataset. If, for some reason the dataset is not shown or rendered by the recipient application (step 1906), the application can handle appropriately at step 1908, (e.g., provide an error message, render the image data on an image graphic renderer such as the renderer 84, and so on). Otherwise, the dataset is available to the recipient application for display or other purposes.

If, however, the header includes multiple data formats, step 1902 branches to step 1910 where one of the multiple data formats is selected. As described in detail above, the data formats could be stored in an order of desirability. If so, the selection could start at the beginning of this list.

At step 1912, a determination is made whether the selected data format is supported by the recipient application. If not, step 1912 branches to step 1914 where a determination is made as to whether all of the multiple data formats have been selected. If not, then the process proceeds back to step 1910 where the next data format is selected. If all data formats have been selected and none are found be supported by the recipient application, step 1914 branches to step 1916 where the application handles appropriately (e.g., issues an error message, renders the image data on an image graphic renderer, or the like).

If a supported data format is found, step 1912 branches to step 1918 where the application is instructed to use the selected data format. The dataset associated with the selected data format is then accessed and handled appropriately (e.g., displayed or rendered). An evaluation of whether the dataset was rendered occurs at step 1920. If, for some reason there is an error in rendering the dataset, or for some other reason the dataset cannot be rendered, step 1920 branches back to step 110 where another data format is selected. As described in detail above, this feature offers data redundancy, that is, if there is an error in processing one dataset using the associated data format, the application may request a dataset in a simpler format and try displaying again. Otherwise, if there is not an error in accessing and rendering the selected dataset, then the dataset is available to the application for display or other purposes.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions for performing steps comprising:

providing rich ink data having a first format, the rich ink data including movement information; and preserving the rich ink data including concealing the rich ink data within a file having a second format, wherein an application or device that is not programmed to recognize the rich ink data processes the file normally, while an application or device that is programmed to recognize the rich ink data extracts the rich ink data from the file.

2. The computer-readable medium of claim 1, wherein the file having a second format comprises an image file format.

3. The computer-readable medium of claim 1, wherein the file includes a logical end of file, and wherein concealing the rich ink data into the file includes appending the rich ink data after the logical end of the file.

4. The computer-readable medium of claim 1, wherein the second format includes color palette indexes to a color palette, and wherein rich ink data is concealed in at least one least significant bit of at least some of the indexes to the color palette.

5. The computer-readable medium of claim 4, wherein each color palette index is eight bits in length, and wherein concealed rich ink data is stored in the least significant bit of selected color palette indexes.

6. The computer-readable medium of claim 1, wherein the second format comprises color data representing color values in a component color scheme, and wherein the rich ink data is concealed in at least one least significant bit of at least some of the color values.

7. The computer-readable medium of claim 6, wherein the component color scheme comprises 24-bit color.

8. The computer-readable medium of claim 6, wherein the component color scheme comprises three color component values for each pixel represented, and wherein the rich ink data is stored in the least significant bit of at least some of the color component values.

9. The computer-readable medium of claim 1, wherein the second format includes comments, and wherein the rich ink data is concealed in the comments.

10. The computer-readable medium of claim 1, wherein the second format allows extra data tags, and wherein the rich ink data is concealed within the extra data tags.

11. The computer-readable medium of claim 1, having further computer-executable instructions comprising concealing data having a third format into the file.

12. The computer-readable medium of claim 1, having further computer-executable instructions comprising arranging the rich ink data in a specialized format.

13. The computer-readable medium of claim 12, wherein arranging the rich ink data includes associating a data structure with the rich ink data.

14. The computer-readable medium of claim 13, wherein the data structure includes a header.

15. The computer-readable medium of claim 14, wherein the data structure includes version information.

16. The computer-readable medium of claim 15, wherein the version information is located within the header.

17. The computer-readable medium of claim 15, wherein the version information is located within the rich ink data.

18. The computer-readable medium of claim 1, wherein the file having the second format is created by forming an image file based on the rich ink data.

19. The computer-readable medium of claim 1, having further computer-executable instructions comprising concealing data having a third format into the file, and further comprising, associating a data structure with the rich ink data and with the data having the third format.

20. The computer-readable medium of claim 19, wherein the data structure comprises a directory with format information for both the first and third formats.

21. A computer system comprising:
a renderer that creates an image file from rich ink data, the rich ink data including movement information; and
a combiner that conceals within the image file the rich ink data in a format that is different from the format of the image file.

22. A computer-readable medium having computer-executable instructions comprising:
providing a file comprising rich ink data in a first format, the file having a second format wherein the first format is concealed within the second format, the rich ink data including movement information; and
extracting the rich ink data from the file.

23. The computer-readable medium of claim 22, having further computer-executable instructions for accessing the rich ink data with a rich ink-compatible reader.

24. The computer-readable medium of claim 23, having further computer-executable instructions for editing the rich ink data.

25. The computer-readable medium of claim 24, having further computer-executable instructions for saving the edited rich ink data.

26. The computer-readable medium of claim 22, wherein the file having the first format comprises an image file format.

27. The computer-readable medium of claim 22, wherein the rich ink data is associated with a data structure.

28. The computer-readable medium of claim 27, having further computer-executable instructions comprising accessing the rich ink data with a rich ink-compatible reader and reading the rich ink data according to the data structure.

29. The computer-readable medium of claim 27, wherein the data structure includes version information.

30. The computer-readable medium of claim 27, wherein the data structure includes a data type identifier.

31. The computer-readable medium of claim 27, wherein the rich ink data includes a header of the data structure.

32. The computer-readable medium of claim 31, wherein the header includes a checksum.

33. The computer-readable medium of claim 22, wherein the second format includes at least one comments section, and wherein the rich ink data is concealed in the at least one comments section.

34. The computer-readable medium of claim 22, wherein the second format allows extra data tags, and wherein the rich ink data is concealed within the extra data tags.

35. A computer system comprising:
an extractor that separates concealed rich ink data from a file having a first format, the rich ink data in a second format, the rich ink data including movement information; and
a rich ink compatible reader that interprets the rich ink data separated from the file by the extractor.

36. A computer-readable medium having computer-executable instructions for performing steps comprising,
providing a file comprising rich ink data in first and second formats, the file having a third format, wherein the first and second formats are concealed within the third format, the rich ink data including movement information; and
extracting rich ink data corresponding to at least one of the first and second formats from the file.

37. The computer-readable medium of claim 36, having further computer-executable instructions comprising, rendering an image from the rich ink data corresponding to at least one of the formats.

38. The computer-readable medium of claim 37, having further computer-executable instructions comprising, enumerating through the first and second formats to find a compatible format for rendering, and selecting the compatible format for rendering the image.

39. The computer-readable medium of claim 38, having further computer-executable instructions comprising, receiving information indicative of a failure in rendering the image from the selected format, enumerating back through the first and second formats to find another compatible format for rendering, and selecting the other compatible format for rendering.

40. The computer-readable medium of claim 36, wherein the first and second formats are associated with data structures, and wherein the concealed rich ink data comprises a data structure directory.

41. A method of communicating between a sender and a remote recipient device, comprising:
   organizing rich ink data into a first format at the sender, the rich ink data including movement information;
   concealing at the sender the rich ink data in the first format within a file having a second format;
   communicating the file to the remote recipient device; and
   at the remote recipient device;
   receiving the file, extracting the rich ink data therefrom, and recognizing the first format.

42. A computer-readable medium having stored thereon a data structure, comprising,
   rich ink data having a first format, the rich ink data including movement information;
   other data in a second format, the rich ink data concealed among the other data such that a component accessing the other data need not be programmed to understand the first format in order to interpret the other data; and
   extracting the rich ink data from the other data.

43. The computer-readable medium of claim 42, wherein the second format comprises an image file format.

44. The computer-readable medium of claim 42, wherein the data structure includes a logical end of file, and wherein the rich ink data is appended after the logical end of the file.

45. The computer-readable medium of claim 42, wherein the second format comprises color palette indexes, and wherein the rich ink data is concealed in at least one least significant bit of selected color palette indexes.

46. The computer-readable medium of claim 45, wherein the color palette indexes are eight bit values, and wherein the concealed rich ink data comprises the eighth bit of the selected color palette indexes.

47. The computer-readable medium of claim 42, wherein the second format comprises color data representing components in a color scheme, and wherein the rich ink data is concealed in the least significant bits of at least some of the color data.

48. The computer-readable medium of claim 47, wherein the color scheme comprises 24-bit color.

49. The computer-readable medium of claim 47, wherein the color scheme comprises a three-color model, and wherein the rich ink data is stored in the least significant bit of each color for selected data of the color scheme.

50. The computer-readable medium of claim 42, wherein the second format includes at least one comments section, and wherein the rich ink data is concealed in the at least one comments section.

51. The computer-readable medium of claim 42, wherein the second format allows extra data tags, and wherein the rich ink data is concealed within the extra data tags.

52. The computer-readable medium of claim 42, wherein data having a third format is concealed in the file.

53. The computer-readable medium of claim 42, wherein the rich ink data is arranged in a specialized format.

54. The computer-readable medium of claim 42, wherein when not concealed, the rich ink data is arranged into a second data structure.

55. The computer-readable medium of claim 54, wherein the second data structure includes a header.

56. The computer-readable medium of claim 55, wherein the second data structure includes a directory.

57. The computer-readable medium of claim 55, wherein the directory includes control data.

58. The computer-readable medium of claim 57, wherein data having a third format is concealed in the data structure, and wherein the directory includes an entry for the data in the first and third formats.

59. The computer-readable medium of claim 1 having further computer-executable instructions comprising, providing the file to another computing device, and extracting the rich ink data from the file at that other computing device.

60. The computer-readable medium of claim 1 having further computer-executable instructions comprising, providing the file to another computing device, determining at the other computing device whether a component is available to extract the rich ink data from the file, and if so, providing the file to that component, and if not, interpreting the data in the file with a program that understands the second file format.

61. The computer-readable medium of claim 60 wherein a component is available to the other computing device that can extract the rich ink data from the file, and having further computer-executable instructions comprising, extracting the rich ink data via the component, and passing the rich ink data to another component that can interpret the rich ink data.

62. The system of claim 21 further comprising, a second computer system that receives the file, the second computer system including an extractor that extracts the rich ink data from the file.

63. The system of claim 62 wherein the second computer system includes a component that interprets the rich ink data extracted from the file.

64. A computer-readable medium having computer-executable instructions for performing the method of claim 41.

65. A computer-readable medium having computer-executable instructions for performing steps comprising:
   providing rich ink data having a first format, the rich ink data including movement information;
   preserving the rich ink data including concealing the rich ink data into a file having a second format, wherein the file includes a logical end of file, and wherein concealing the rich ink data into the file includes appending the rich ink data after the logical end of the file; and
   extracting the rich ink data from the file.

66. A computer-readable medium having computer-executable instructions for performing steps comprising:
   providing rich ink data having a first format, the rich ink data including movement information; and
   preserving the rich ink data including concealing the rich ink data into a file having a second format, wherein the file includes a logical end of file, wherein the second format includes color palette indexes to a color palette, and wherein rich ink data is concealed in at least one least significant bit of at least some of the indexes to the color palette for extraction.

67. The computer-readable medium of claim 66, wherein each color palette index is eight bits in length, and wherein concealed rich ink data is stored in the least significant bit of selected color palette indexes.

68. A computer-readable medium having computer-executable instructions for performing steps comprising:

providing rich ink data having a first format, the rich ink data including movement information;

preserving the rich ink data including concealing the rich ink data into a file having a second format, wherein the second format comprises color data representing color values in a component color scheme, and wherein the rich ink data is concealed in at least one least significant bit of at least some of the color values; and extracting the rich ink data.

69. The computer-readable medium of claim 68, wherein the component color scheme comprises 24 bit color.

70. The computer-readable medium of claim 68, wherein the component color scheme comprises three color component values for each pixel represented, and wherein the rich ink data is stored in the least significant bit of at least some of the color component values.

71. A computer-readable medium having computer-executable instructions comprising:

providing a file comprising concealed rich ink data in a first format, the file having a second format, the rich ink data including movement information; and extracting the rich ink data from the file, wherein the file includes a logical end of file, the rich ink data is appended after the logical end of the file, and wherein extracting the rich ink data comprises reading the rich ink data from the end of the file.

72. A computer-readable medium having computer-executable instructions comprising:

providing a file comprising concealed rich ink data in a first format, the file having a second format, the rich ink data including movement information; and extracting the rich ink data from the file, wherein the second format includes color palette indexes to a color palette, and wherein the rich ink data is concealed in selected bits of selected color palette indexes.

73. The computer-readable medium of claim 72, wherein the color palette indexes are eight-bit values, and wherein the rich ink data is concealed in at least one least significant bit of the selected color palette indexes.

74. A computer-readable medium having computer-executable instructions comprising:

providing a file comprising concealed rich ink data in a first format, the file having a second format, the rich ink data including movement information; and extracting the rich ink data from the file, wherein the second format comprises color data representing components in a color scheme, and wherein the rich ink data is concealed in the least significant bits of selected color data.

75. The computer-readable medium of claim 74, wherein the color scheme comprises 24-bit color.

76. The computer-readable medium of claim 75, wherein the color scheme comprises pixel data having each pixel represented by three color components, and wherein the rich ink data is stored in least significant bits of selected color components.

* * * * *